United States Patent
Dodds (10) Patent No.: US 9,465,130 B2
(45) Date of Patent: Oct. 11, 2016

(54) MONITORING THE DIPOLE MOMENT VECTOR OF AN AIRBORNE ELECTROMAGNETIC SURVEY SYSTEM

(75) Inventor: Jack Dodds, Aurora (CA)

(73) Assignee: GEO EQUIPMENT MANUFACTURING LTD, Aurora (CA)

( * ) Notice: Subject to any disclaimer, the term of this patent is extended or adjusted under 35 U.S.C. 154(b) by 206 days.

(21) Appl. No.: 14/003,765

(22) PCT Filed: Mar. 7, 2012

(86) PCT No.: PCT/CA2012/050136
§ 371 (c)(1),
(2), (4) Date: Dec. 11, 2013

(87) PCT Pub. No.: WO2012/119254
PCT Pub. Date: Sep. 13, 2012

(65) Prior Publication Data
US 2014/0084930 A1    Mar. 27, 2014

Related U.S. Application Data

(60) Provisional application No. 61/449,868, filed on Mar. 7, 2011.

(51) Int. Cl.
*G01V 3/16* (2006.01)
*G01V 3/165* (2006.01)
*G01V 3/17* (2006.01)

(52) U.S. Cl.
CPC ............... *G01V 3/165* (2013.01); *G01V 3/17* (2013.01)

(58) Field of Classification Search
None
See application file for complete search history.

(56) References Cited

U.S. PATENT DOCUMENTS

| 7,157,914 B2 | 1/2007 | Morrison et al. |
| 2003/0094952 A1 | 5/2003 | Morrison et al. |
| 2009/0212778 A1 | 8/2009 | Kuzmin et al. |
| 2010/0244843 A1 | 9/2010 | Kuzmin et al. |

FOREIGN PATENT DOCUMENTS

| WO | 2009105873 A1 | 9/2009 |
| WO | 2010022515 A1 | 3/2010 |
| WO | 2011063510 A1 | 6/2011 |
| WO | 2012119254 A1 | 9/2012 |

OTHER PUBLICATIONS

International Search Report for International Application No. PCT/CA2012/050136 dated Jun. 1, 2012.
Written Opinion of the International Searching Authority or International Application No. PCT/CA2012/050136 dated Jun. 1, 2012.
Notification of Transmittal of the International Search Report and the Written Opinion of the International Searching Authority, or the Declaration.

*Primary Examiner* — Paresh Patel
(74) *Attorney, Agent, or Firm* — Polsinelli PC (57) ABSTRACT

An airborne electromagnetic survey system that monitors the dipole moment. A TDEM system includes a flexible transmitter loop and a receiver having three sensors with mutually perpendicular sensitive axes. In flight, mechanical and aerodynamic forces cause the transmitter loop to tilt and flex, which affects the direction and magnitude of the primary field dipole moment. The processing system measures the sign and amplitude of the primary field sensed by the receiver in each of its sensitive axes and calculates a vector which represents the orientation of the primary field in the receiver frame of reference at the receiver location. Using this vector, the processing system determines the orientation of the primary field dipole moment.

10 Claims, 10 Drawing Sheets

← spike

MONITORING THE DIPOLE MOMENT VECTOR OF AN AIRBORNE ELECTROMAGNETIC SURVEY SYSTEM

CROSS-REFERENCE TO RELATED APPLICATIONS

This application is a national stage entry of PCT/CA2012/050136, filed on Mar. 7, 2012, which claims priority to U.S. Provisional Application No. 61/449,868, filed Mar. 7, 2011, said application is expressly incorporated herein in its entirety.

BACKGROUND

Embodiments described herein relate to the field of airborne geological mapping.

Active source electromagnetic surveying EM such as time domain electromagnetic (TDEM) surveying is a rapidly developing area of geophysical surveying. It encompasses ground based and airborne applications. TDEM geological mapping involves measuring the magnetic response of the earth to a primary magnetic field transmitted by the survey system. The relation between the transmitted primary field and the response is used to calculate the electrical resistivity structure of the earth, from which geological information is inferred.

Examples of TDEM surveying systems and methods are shown in U.S. Pat. No. 7,157,914 and WIPO patent applications PCT/CA2009/001197, PCT/CA2009/000217 and PCT/CA2010/001863.

SUMMARY

According to a first example embodiment there is provided an airborne time domain electromagnetic (TDEM) geological surveying system that includes: a transmitter loop that lies substantially in a plane during flight, the transmitter loop having regions that can have different relative positions to the plane in response to external forces; a receiver having three mutually non-parallel sensitive axes, the receiver being positioned at a substantially constant location relative to the transmitter loop; and a processing system connected to receive signals from the receiver for the three sensitive axes and from the attitude and heading sensor system. The processing system: measures a sign and amplitude of a primary field sensed by the receiver in each of the sensitive axes; calculates, in dependence on the measured signs and amplitudes, a vector which represents orientation of the primary field at the receiver location in a receiver frame of reference; and determines, in dependence on the vector an orientation of the primary field dipole moment in a receiver frame of reference.

According to another example embodiment is a method for monitoring a primary field dipole moment in a TDEM geological surveying system that comprises (i) a transmitter loop that lies substantially in a plane during flight and has regions that can have different relative positions to the plane in response to external forces; and (ii) a receiver having three mutually non-parallel sensitive axes, the receiver being positioned at a substantially constant location relative to the transmitter loop. The method includes: measuring a sign and amplitude of a primary field sensed by the receiver in each of the sensitive axes and in dependence thereon calculating a vector which represents orientation of the primary field at the receiver location in a receiver frame of reference; and determining, in dependence on the vector an orientation of the primary field dipole moment in a receiver frame of reference.

BRIEF DESCRIPTION OF THE DRAWINGS

FIG. 6 is an example of a waveform sensed by a transmitter monitor sensor signal (FIG. 6a) and the receiver coil (FIG. 6b) in the system of FIG. 1, showing spikes caused by differences between the bucking coil current and the transmitter coil current.

DESCRIPTION OF EXAMPLE EMBODIMENTS

An active source electromagnetic survey system has a transmitter and a receiver. Typically a transmitter includes a coil of one or more turns of electrical wire. When an electric current is passed through the wire, a magnetic field is transmitted. In TDEM surveying, a pulsed current of alternating polarity is passed through the transmitter coil. The receiver senses the response of the earth in the "off" time between transmitter current pulses.

The strength (dipole moment) of the magnetic field transmitted by a transmitter coil is strongly dependent on the size of the coil. The characteristics of the survey aircraft limit the acceptable weight and aerodynamic drag of the transmitter coil. To achieve a large dipole moment with an acceptable weight and drag, the transmitter in some TDEM systems is implemented as one or more of a non-rigid, semi-rigid, flexible or semi-flexible structure.

A receiver sensor typically includes of one or more multiturn coils of electrical wire, although other types of sensors are sometimes used. In the presence of a changing magnetic field, an electrical voltage appears across the terminals of each coil. This voltage can be amplified and recorded. A receiver coil has a defined sensitive axis, so that it responds to the magnetic field vector component which is parallel to the sensitive axis. A TDEM receiver sensor typically includes a coil with a nominally vertical sensitive axis, and may include one or more coils with nominally horizontal axes.

In some TDEM systems, the transmitter loop is in the form of a circle or a regular polygon which lies in a nominally horizontal plane. In some TDEM systems the receiver is located at the center of the transmitter loop. Some TDEM systems may include a "bucking loop", which is a smaller loop located inside and coplanar with the transmitter loop, configured so as to minimize the strength of the primary field at the location of the receiver, thereby reducing the dynamic range of the received signal.

At locations sufficiently distant from the transmitter loop ("far field"), the primary transmitted field is substantially the same as the field of a magnetic dipole which can be characterized by a vector, its "dipole moment". In the following discussion, this vector is referred to as the "primary field dipole moment". It adequately characterizes the primary field transmitted by the TDEM system. The response of an active source EM system to the earth is affected by the orientation of the primary field dipole moment, and the orientation of the sensitive axes of the receiver sensors. Departures of the primary field dipole moment and the receiver from their nominal orientations cause errors in the interpretation of the results.

The effectiveness of a bucking loop is affected by the shape, relative position and orientation of the transmitter loop, bucking loop, and receiver. Departures of these components from their nominal configuration will reduce the effectiveness of the bucking loop.

In the case of a non-rigid, semi rigid, flexible or semi-flexible transmitter loop the orientation of the transmitter loop, bucking loop (if present) and receiver may vary significantly relative to one another and relative to a geographical frame of reference during flight. Furthermore, the transmitter loop may flex significantly during flight, so that measurement of the attitude of one part of the transmitter loop may not accurately define the attitude of all parts of the loop or the primary field dipole moment.

In at least some TDEM system applications, it is desirable to continuously measure the orientation of the primary field dipole moment and the orientation of the receiver of an active source electromagnetic system during operation so that the orientations can be taken into account in the interpretation of the data.

In at least some TDEM system applications, it is desirable to measure the orientation of the transmitter loop, bucking loop (if present) and the receiver of an active source electromagnetic system during operation of the system so that adjustments to the system geometry can be effected.

In a first example embodiment, the TDEM system includes a transmitter loop and a receiver having three sensors with mutually perpendicular sensitive axes. An attitude and heading sensor unit is incorporated into the receiver. The transmitter loop approximates a regular polygon lying in a horizontal plane and is semi-rigid or flexible such that different sections of the loop can, within defined structural limitations, have different relative positions to the horizontal plane in response to external forces. The receiver is located at the approximate center of the transmitter loop. In flight, mechanical and aerodynamic forces cause the transmitter loop to tilt and flex, which affects the direction and magnitude of the primary field dipole moment. Radial cables, all under tension and all of equal length, attach the receiver to the vertices of the transmitter loop polygon. The cables maintain all segments of the transmitter loop at substantially the same distance from the receiver. A processing system receives the signals from the three receiver sensors and the attitude and heading sensor system. At frequent intervals, based on the attitude and heading sensor system signals, the processing system determines the orientation of the receiver in a geographical frame of reference. The processing system measures the sign and amplitude of the primary field sensed by the receiver in each of its sensitive axes and calculates a vector which represents the orientation of the primary field in the receiver frame of reference at the receiver location. Because the semi-flexible transmitter coil structure maintains all segments of the loop at substantially the same distance from the receiver, the orientation of the primary field at the receiver is a good estimate of the orientation of the primary field dipole moment, in the receiver frame of reference. Using this estimate, the processing system determines the orientation of the primary field dipole moment in a geographical frame of reference.

In second example embodiment, the TDEM system includes a transmitter loop, a bucking loop, and a receiver having three sensors with mutually perpendicular sensitive axes. The transmitter loop and bucking loop approximate two regular polygons with a common center lying in a horizontal plane. The transmitter loop and bucking loop are both semi-rigid or flexible such that different sections of the loop can, within defined structural limitations, have different relative positions to the horizontal plane in response to external forces. The receiver is located at the approximate center of the loops. In flight, mechanical and aerodynamic forces cause the transmitter loop and bucking loop to tilt and flex, which affects the direction and magnitude of the dipole moment of the transmitter loop and the bucking loop. Radial cables, all under tension and all of equal length, attach the receiver to the vertices of the bucking loop polygon, and extensions of those cables, all of equal length, attach each vertex of the bucking loop polygon to the corresponding transmitter loop polygon. The cables maintain all segments of the bucking loop at substantially the same distance from the receiver, and likewise maintain all segments of the transmitter loop at substantially the same distance from the receiver. An attitude and heading sensor unit is mounted on the receiver. A processing system receives the signals from the three receiver sensors and the attitude and heading sensor system. At frequent intervals, based on the attitude and heading sensor system signals, the processing system determines the attitude of the receiver in a geographical frame of reference. The transmitter loop and bucking loop are arranged so that the waveform of the current in the two loops is slightly different, due to capacitance between parts of the loops. The processing system measures the complete waveform of the primary transmitted field in the signals from each of the receiver sensors. The waveforms are analyzed by statistical means to separate the contribution of the transmitter loop from the contribution of the bucking loop. Based on this analysis, the processing system measures the sign and amplitude of the contribution of the transmitter loop only to the field sensed by the receiver and calculates a vector which represents the orientation of the transmitter loop contribution in the receiver frame of reference. The processing system independently measures the sign and amplitude of the contribution of the bucking loop only to the field sensed by the receiver and calculates a vector which represents the orientation of the bucking loop contribution in the receiver frame of reference. The orientation of the transmitter loop contribution to the primary transmitted field at the receiver is a good estimate of the orientation of the primary transmitted field dipole moment. The orientation of the bucking loop can be used to further correct the estimate. Using these estimates, the processing system determines the orientation of the primary field dipole moment in a geographical frame of reference.

In a third example embodiment, the TDEM system includes a transmitter loop and a receiver having three sensors with mutually perpendicular sensitive axes. The transmitter loop approximates a regular polygon lying in a horizontal plane and is semi-rigid or flexible such that different sections of the loop can, within defined structural limitations, have different relative positions to the horizontal plane in response to external forces. The receiver is located at the approximate center of the transmitter loop. An attitude and heading sensing system is used to track an orientation of the transmitter loop—for example, three GPS receivers are attached to the transmitter loop at substantially equal intervals around the loop. In flight, mechanical and aerodynamic forces cause the transmitter loop to tilt and flex, which affects the direction and magnitude of the primary field dipole moment. Radial cables, all under tension and all of equal length, attach the receiver to the vertices of the transmitter loop polygon. The cables maintain all segments of the transmitter loop at substantially the same distance from the receiver. A processing system receives the signals from the three receiver sensors and the three GPS receivers. At frequent intervals, based on the GPS signals, the processing system determines the attitude of the transmitter loop in a geographical frame of reference. The processing system measures the sign and amplitude of the primary field sensed by the receiver in each of its sensitive axes and calculates a vector which represents the orientation of the primary field in the receiver frame of reference at the receiver location. Because the semi-flexible transmitter coil structure maintains all segments of the loop at substantially the same distance from the receiver, the orientation of the primary field at the receiver is a good estimate of the orientation of the primary field dipole moment, in the receiver frame of reference. The attitude of the transmitter loop is an estimate of the direction of the primary field dipole moment, in a geographical frame of reference. Using the difference between the calculated orientation of the primary field in the receiver frame of reference at the receiver location and the estimates of the orientation of the primary field dipole moment in the receiver frame of reference (the orientation of the transmitter loop), the processing system determines the orientation of the receiver in a geographical frame of reference. In some example embodiments the above described bucking loop embodiment can be combined with this third embodiment.

A closed loop of wire carrying an electric current creates a magnetic field. At positions which are distant from the loop, the magnetic field can be approximated by the field of a magnetic dipole and can be described in terms of a magnetic dipole moment vector M.

The Biot-Savart Law gives this expression for the field due to the loop.

$$B(r_0) = \frac{\mu_0 I}{4\pi} \oint \frac{(r-r_0) \times dl}{|r-r_0|^3}$$

where $B(r_0)$ is the field at position $r_0$,
dl is an element of the loop circumference,
r is the position of dl,
I is the loop current,
$\mu_0$ is the permittivity of free space.

The above expression can be manipulated to show that, far from the loop, the field of the loop can be approximated by this expression.

$$B(r_0) = \frac{\mu_0}{2\pi} \frac{1}{|r_0|^3} \left[ M + 3\left(M \bullet \frac{r_0}{|r_0|}\right) \frac{r_0}{|r_0|} \right]$$

where $r_0$ is the position at which the field is measured.

$$M = \frac{I}{2} \oint r \times dl$$

is the dipole moment vector.

The field at the origin of coordinates is obtained by setting $r_0 = O = [0, 0, 0]$.

$$B(0) = \frac{\mu_0 I}{4\pi} \oint \frac{r \times dl}{|r|^3}$$

Consider a loop that is tilted and flexed relative to the coordinate system, yet all points of the loop are at a fixed distance from the origin of coordinates, $|r|=a$. Then the above expression can be simplified.

$$B(0) = \frac{\mu_0 I}{4\pi} \frac{1}{a^3} \oint r \times dl$$
$$= \frac{\mu_0}{2\pi} \frac{1}{a^3} M$$

where a is the radius of the loop, $|r|=a$, $$M = \frac{I}{2} \oint r \times dl$$

is the dipole moment vector.

It follows that the direction of the magnetic field at the origin is the direction of the dipole moment vector M which characterizes the field of the loop at points distant from the loop. The magnitude of the field at the origin is also dependent only on the magnitude of M and the distance a between the receiver and the loop.

This analysis could be extended to the case of a TDEM system with a polygonal flexible or semi-rigid transmitter loop, with the receiver held in place by cables at the center of the loop, with the location of the receiver taken as the origin of the coordinate system. In that case, $|r|=a$ only at the vertices of the polygonal loop, but any given point on the loop remains at a substantially fixed distance from the loop regardless of tilting and flexing of the loop. There is also some variation $|r|$ caused by stretching of the cables. In the case of flexing in which exactly one vertex of the polygon is non-coplanar with the other vertices, there will be some slack in the cables which will be taken up by the elasticity of the cables. This will cause errors, but these will be small provided that all vertices remain within a fraction of the loop diameter of the nominal plane of the loop.

Figure 1:
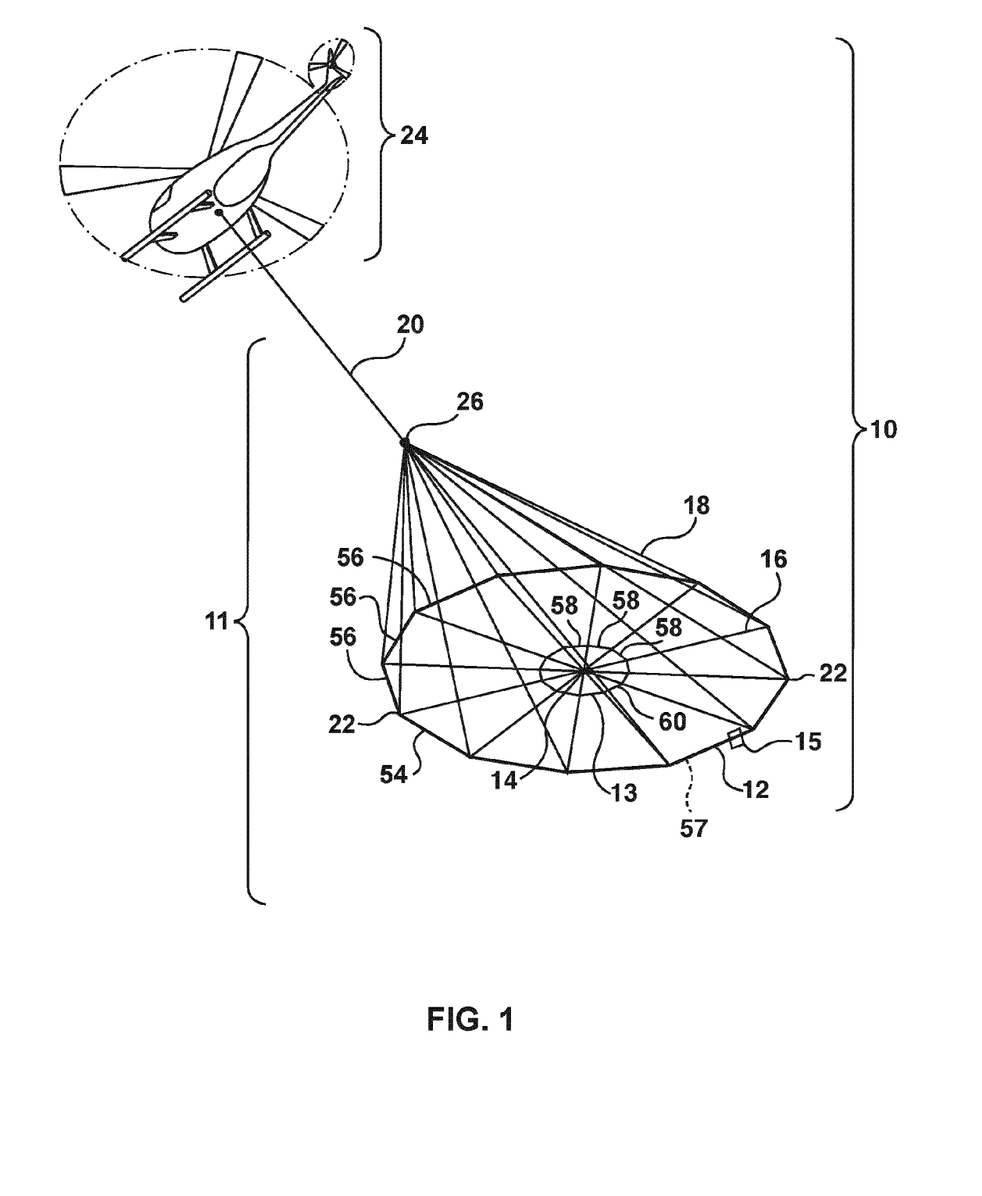
FIG. 1 is a perspective diagrammatic view of an airborne electromagnetic survey system according to an example embodiment of the invention.

For the purposes of explaining one example embodiment, FIG. 1 shows a schematic view of an airborne TDEM survey system 10 that includes an aircraft 24 (which could be an airplane, helicopter, balloon or airship, for example) and a tow assembly 11. The tow assembly 11 includes a transmitter loop 12, a bucking loop 13, a receiver 14, and transmitter monitor sensor 15 (which could for example be a current monitor). The transmitter loop 12, bucking loop 13, and receiver 14 are held in position relative to one another by radial cables 16 which are not electrically conductive. The transmitter loop 12 and bucking loop 13 are flexible and may for example be comprised of rigid tubular segments which rotate around their long axes at the joints 22, 23 between the loop segments. For example, transmitter loop 12 may include a transmitter frame 54 made of a plurality of elongate hollow straight rigid tubular segments 56 that are joined to partially rotate around their long axes at joints 22 between segments 56. The transmitter loop 12 includes multi-turn electrical conductor 57 housed within the transmitter frame 54. Similarly, bucking loop 13 may include a bucking loop frame 60 that is a smaller diameter version of the transmitter frame 54 and is also made of a plurality of elongate hollow straight rigid tubular segments 58 that are joined to partially rotate around their long axes at joints 23 between segments 58. The bucking loop 13 includes a single or multi-turn electrical conductor 62 housed within the bucking loop frame 54. In the illustrated embodiment, the transmitter loop 12 and bucking loop 13 are each twelve sided regular polygons such that they each approximate a circle, however the loops 12 and 13 could have more or fewer segments or sides and could in some embodiments be substantially circular with the segments 56,58 being formed from curved tubular sections. In embodiments in which the transmitter loop orientation/position is tracked, an attitude and heading sensing system comprising three or more GPS sensors 52 are located on the transmitter loop 12. In other embodiments, the attitude and heading sensing system could alternatively include GPS sensors 52 could be located on the radial cables 16, suspension cables 18, or elsewhere on the tow assembly 11. In some example embodiments, gyroscopic and accelerometer based sensors could be used in addition to or as an alternative to GPS sensors in the attitude and heading sensing system.

The transmitter loop 12, bucking loop 13, and receiver 14 are suspended from the aircraft 24 via a cable 20, which provides physical support and electrical connections, to a common tow point 26 which in turn supports suspension cables or ropes 18. To simplify the diagram, only the suspension cables 18 for the transmitter loop 12 are shown, however, similar cables may be provided to support the bucking loop 13 and the receiver 14 from the tow point 26.

In an example embodiment, the transmitter loop 12, bucking loop 13 and receiver 14 are configured to be substantially co-planar and concentric when in flight, subject to variations in relative position that may occur as described below.

Transmitter and processing system electronics 25 in the aircraft 24 is connected via electrical conductors in cable 20 to the tow point 26. From there, electrical cables attached to one or more of the suspension cables 18 connect to the receiver 14, transmitter monitor sensor 15, and the transmitter loop 12. Electrical cables may be attached to one of the radial cables 16 to connect the bucking loop 13 to the transmitter loop 15. Many possible arrangements of the electrical wiring are possible.

Figure 2:
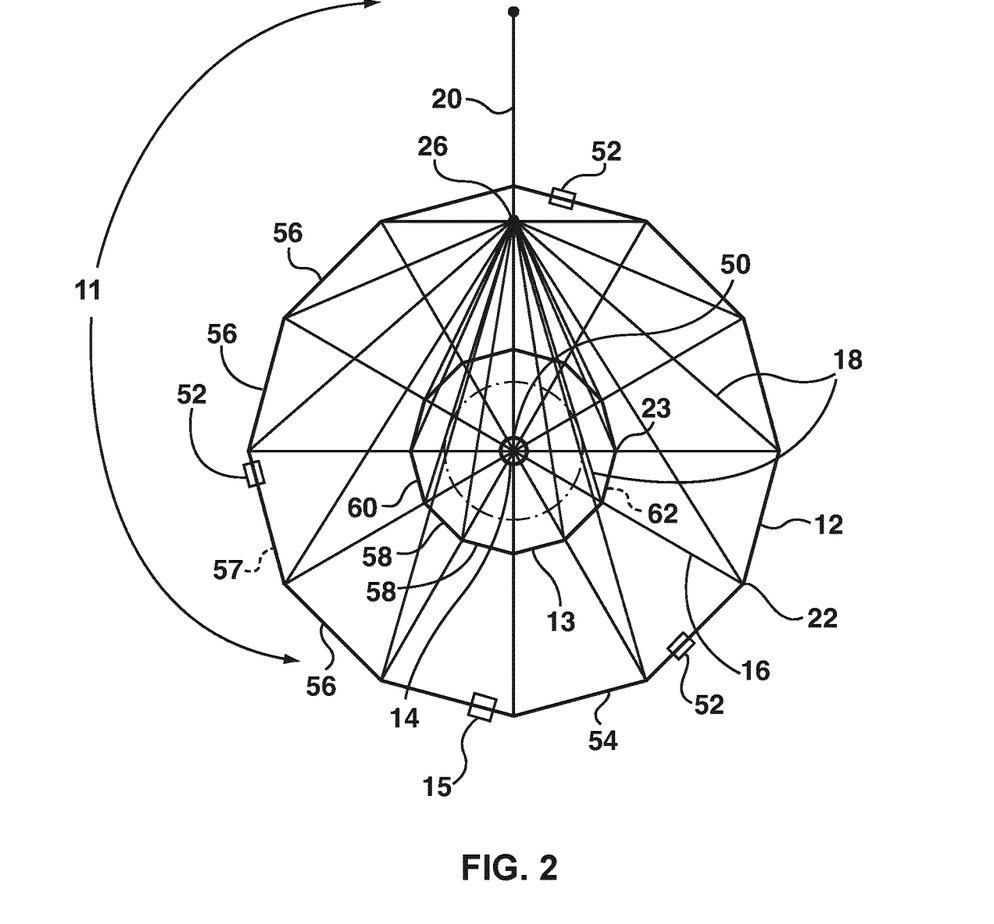
FIG. 2 is a top-view of the transmitter coil, bucking coil, and receiver in the system of FIG. 1.
Figure 3A:
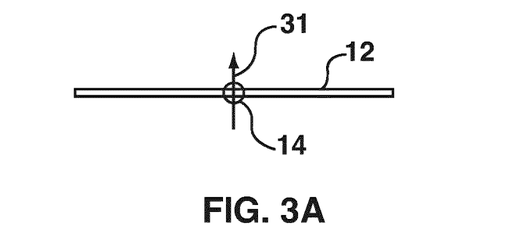
FIGS. 3A to 3E are schematic side views showing the transmitter loop of FIG. 1, the direction of its primary field at the receiver, and the receiver, showing tilting and flexing of the transmitter coil.
Figure 3B:
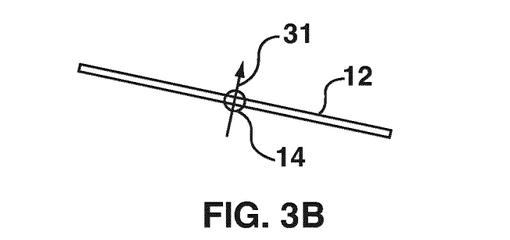
Figure 3C:
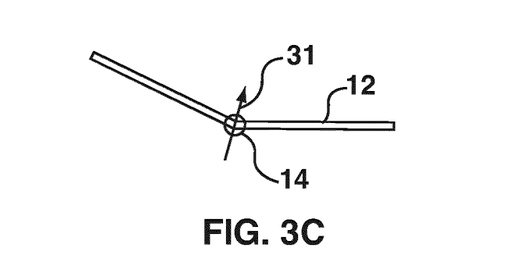
Figure 3D:
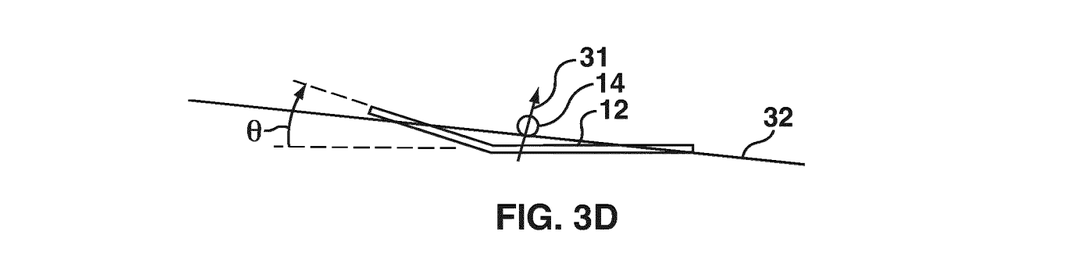
Figure 3E:
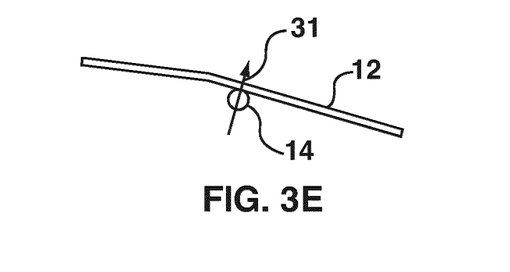

FIG. 2 shows a top view of the tow assembly 11, showing in more detail the arrangement of the transmitter loop 12, a bucking loop 13, and receiver sensor 14, radial cables 16, and suspension cables 18. In embodiments in which the transmitter loop orientation/position is tracked, the transmitter loop 12 includes a GPS sensing system that includes three or more GPS sensors 52 located at substantially equal intervals on the transmitter loop 12.

Figure 8A:
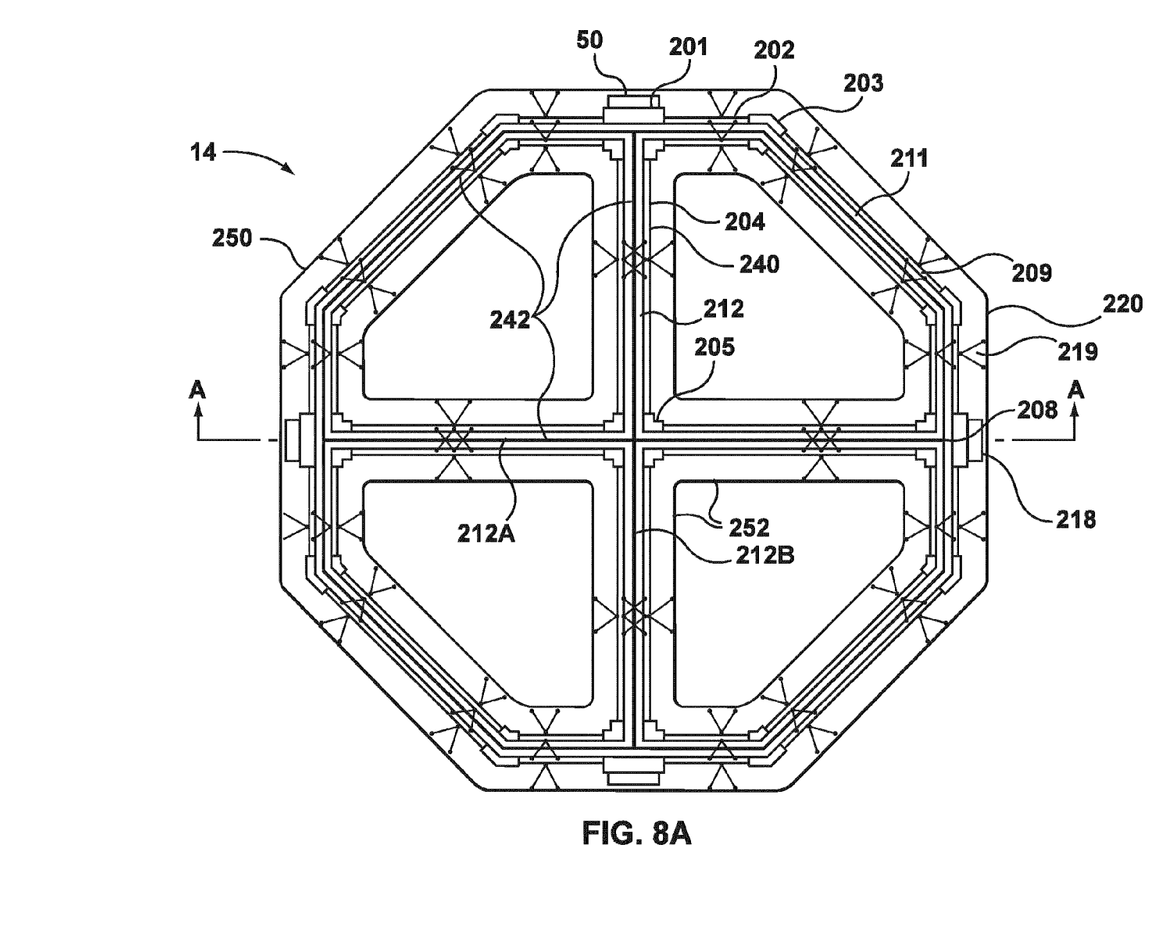
FIG. 8A is a view of alternative receiver coil system that can be used in the airborne electromagnetic survey system of FIG. 1. This is a plan view, with the upper half of the outer shell removed to shown the inner shell and coil assembly.
Figure 8B:
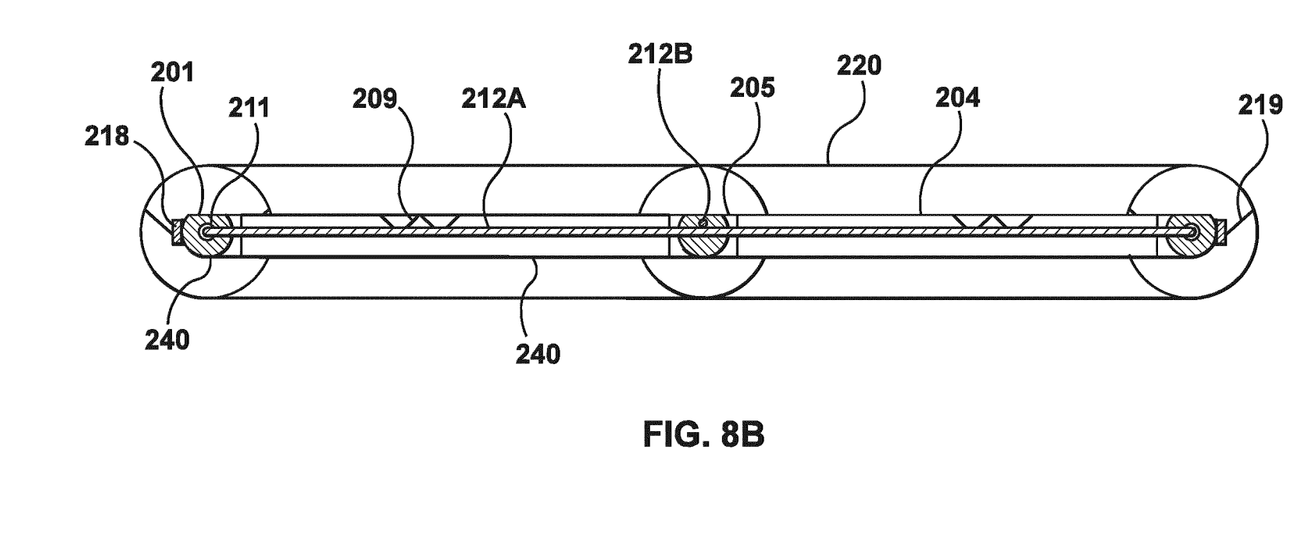
FIG. 8B is a cutaway side view of the alternative receiver coil system shown in FIG. 8A, taken along the lines A-A of FIG. 8A.
Figure 9:
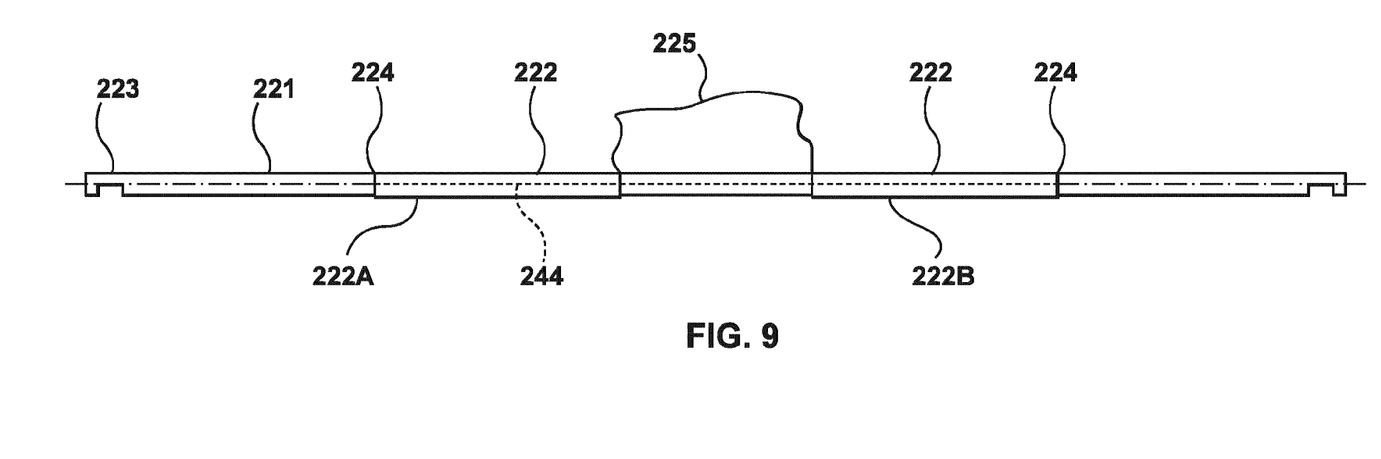
FIG. 9 is a diagram of a solenoid coil assembly with a ferromagnetic core, which is a component of the receiver coil system shown in FIG. 5.

FIGS. 8A, 8B and 9 illustrate one possible embodiment of receiver 14. The receiver 14 includes an outer tubular frame or shell 220 housing an inner frame or shell 240 in which an inner coil assembly 242 is positioned. In the plan view of FIG. 8A, an upper half of the tubular outer shell 220 is removed to show the inner shell 240 and inner coil assembly 242. In some example embodiments, an upper half of the tubular outer shell 220 is releasably secured to a lower half to allow the halves to be separated for servicing of the inner shell 240 and inner coil assembly 242. In the illustrated embodiment, the tubular outer shell 220 includes an outer polygonal portion 250 with a central X or t-shaped portion 252. Polygonal portion 250 is octagonal in FIG. 8A, and approximates a circle, however it could take other forms—for example it could be circular or square or have more or fewer sides than eight. The semi-rigid outer shell 220 has a nominally vertical extent which is substantially less than a horizontal extent thereof, giving the shell a small vertical profile.

The inner coil assembly 242 includes first sensor in the form of multiturn air core receiver coil 211 with a nominally vertical axis ("Z coil"), and second and third sensors in the form of two solenoid coils 212A and 212B (referred to generically using reference 212 herein) with ferromagnetic cores ("cored coils") with mutually orthogonal, nominally horizontal axes. The air coil receiver loop 211 is housed primarily within the polygonal portion 250 of outer shell 220, and the cored coils 212A, 212B are housed primarily with the central X or t shaped portion 252. Accordingly, in an example embodiment, the outer shell 220 is a semi-rigid shell having a tubular outer portion 250 defining a polygonal or circular loop and a cross-shaped portion 252 having a first tubular cross member sxtending across a first diameter having a first tubular cross member extending across a first diameter of the tubular outer portion 250 and a second tubular cross member extending across a second diameter of the tubular outer portion 250 that is perpendicular to the first diameter. The outer portion 250 and the cross-shaped portion 252 are in a nominally horizontal plane. The outer polygonal or circular portion 250 of each shell includes a multi-turn air coil receiver coil 211 of electrical wire, while coils 212A and 212B made up of multiturn solenoid windings with rod shaped ferromagnetic cores are each positioned in a respective cross member. The inner shell 240 has a shape that corresponds to that of the outer shell 220. In some examples, the inner coil assembly 242 is suspended from the inner shell 240 by highly compliant sets of elastomeric cords 209. The cords 209 are positioned so as to support the inner coil assembly 242 (and in particular each of the air coil receiver 211, and cored coils 212A and 212B) at multiple points so that inertial forces are applied uniformly to the inner coil assembly 242, thereby reducing the resulting bending moments on components of the assembly 242. An example of one of the cored coils 212A, 212B is shown in more detail in FIG. 9, and consist of a rigid plastic tube 221, a winding 222 that extends along the plastic tube 221 in two separate parts 222A and 222B connected in series by a wire 225, and a rod shaped ferromagnetic core 244. An attitude and heading sensor unit 50 is integrated into the receiver 14.

The core 244 is shown schematically in FIG. 9, as a dotted line. It may for example have an approximately circular or square cross-section which is able to fit within the plastic tube 221, having a width comparable to the inner diameter of the plastic tube 221. The core 244 is fixed inside the plastic tube 221 and is at least long enough to occupy the tube 221 inside both sections 222A and 222B of the winding 222. The plastic tube 221 has two notches 223 at its ends, which hook over the Z coil 211. One cored coil 212A hooks over and is attached to the Z coil 211 from below and the other cored coil 212B hooks over and is attached to the Z-coil 211 from above, so that the cored coils 212A, 212B make contact and cross over each other at the center of the receiver 14. The spaced apart coil sections 222A, 222B on each cored coil 212A, 212B is located on opposite sides of the center of the receiver 14. In an example embodiment, the ferromagnetic core 244 is constructed of a material that has minimal magnetostriction so as to reduce noise generated by flexing of the core. In the case of a TDEM system, the core 244 is processed to minimize its tendency to acquire remnant magnetization in response to the transmitted field. In other example embodiments, the mechanical details of the air core coil 211 and cored coils 212A, 212B and their installation may differ from the example embodiment.

FIG. 3 is a schematic side view of the transmitter loop 12 and receiver 14 only, which illustrates some possible types of movement of the transmitter loop 12 relative to the receiver 14 and its effect on the primary field dipole moment, represented as a vector 31. FIG. 3A shows the nominal arrangement of the transmitter loop. The loop lies in a horizontal plane and the dipole moment is vertical. In FIG. 3B, the assembly is tilted, but the position of each part of the transmitter loop in the receiver sensor frame of reference is unchanged, and so the dipole moment is tilted by an equal angle, and there is no effect on the distance between the receiver sensor and points on the transmitter loop. In FIG. 3C, part of the assembly is flexed, that is, the relative positions of the parts of the assembly are changed. In this case, the flexing is such that the left side of the loop rotated about a line that passes through the receiver sensor position. Consequently the distance between the receiver and every point on the transmitter loop remains unchanged from FIG. 3*a* (as assumed in the mathematical analysis above). In FIG. 3D part of the assembly is flexed such that it is folded about a line that does not pass through the receiver. This mode of flexing changes the distance between the receiver sensor and parts of the transmitter loop by varying amounts. However, it is evident that the effect is roughly proportional to the $(1-\cos\Theta)$ of the angle of flexing, so that it is a "second order" effect which is very small provided that the departure of the loop from the nominal plane of the loop 32 is small. This small change is possible because of elasticity in the radial cables 16. FIG. 3*e* shows a combination of tilting and flexing of the loop.

It is evident from FIGS. 3A-3E that in all modes of tilting, and some modes of flexing, the radial cables 16 will maintain a substantially fixed distance between the receiver and points on the transmitter loop. In other modes of flexing (made possible by elasticity of the radial cables 16) there will be an effect on these distances, but such effects will be small, the relative change in the distances being of the order of the square of the ratio of the deviation of the loop from its nominal plane, to the diameter of the loop.

Figure 4:
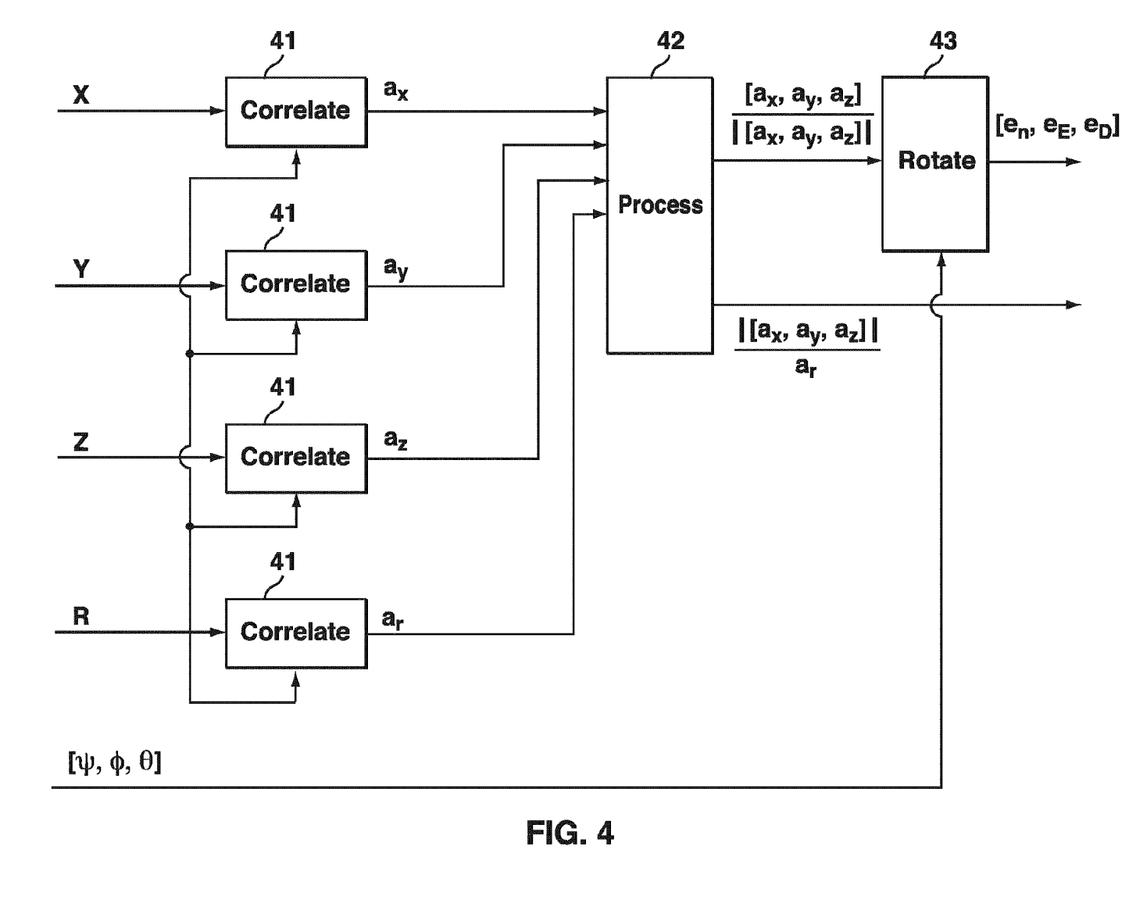
FIG. 4. is a block diagram of a signal processing technique which is used in some example embodiments to determine the orientation of the primary field dipole moment in a geographic frame of reference.

FIG. 4 is a block diagram of a signal processing technique applied by signal processing system 25 which is used in some example embodiments to determine the orientation of the primary field dipole moment in a geographic frame of reference. In these example embodiments the bucking loop 13 is omitted, so the primary magnetic field sensed by the receiver is entirely due to the transmitter loop. The primary input to the processing technique of FIG. 4 consists of four signals (X, Y, Z, R) from the three sensitive axes (X,Y,Z) of the receiver sensor 14, and from a transmitter monitor sensor 15 (R). These signals are substantially the instantaneous time rate of change of the magnetic field components in each of the three sensitive directions (X,Y,Z) of the receiver sensor, and the time rate (R) of change of the transmitter loop current. Receiver orientation information derived from an attitude and heading sensor, for example as Euler angles $[\Psi, \Phi, \theta]$ (heading, elevation, and bank), is a secondary input. Each of the four primary input signals (X,Y,Z,R) is correlated with the fourth primary input, the current monitor sensor signal (R), in correlators 41. From the correlator outputs, the processor 42 calculates a vector $a=[a_x, a_y, a_z]$, and from it calculates $a/|a|$ which defines the direction of the magnetic field at the receiver, in receiver (x,y,z) coordinates; and it calculates the scalar ratio $|a|/a_r$. The rotation processor 43 uses the secondary input from the attitude sensors to rotate the direction vector $a/|a|$ into a geographical (e.g. north, east, down) frame of reference giving $e=[e_x, e_y, e_z]$, which is an estimate of the direction of the primary field dipole moment in geographical coordinates.

In some example embodiments, the four primary input signals of FIG. 4 are electrical analog signals, while the secondary receiver orientation information is in digital form 10 times per second for example. In that case the correlators 41 may include an analog to digital converter (with a sample rate of 192,000 samples/s/channel for each input signal for example), and software modules which calculate digital outputs at the rate of 10/s for example. The processors 42 and 43 may be software modules which calculate digital outputs at the rate of 10/s for example. In other example embodiments, all the inputs to the processing of FIG. 4 may be digital time series and the processing may be entirely implemented in software modules in a digital computer. In some example embodiments the processing is implemented in real time in electronics in the towing helicopter 24. In other example embodiments the signal waveforms are recorded by equipment in the helicopter and the signal processing is performed at a later time on the ground.

Figure 5:
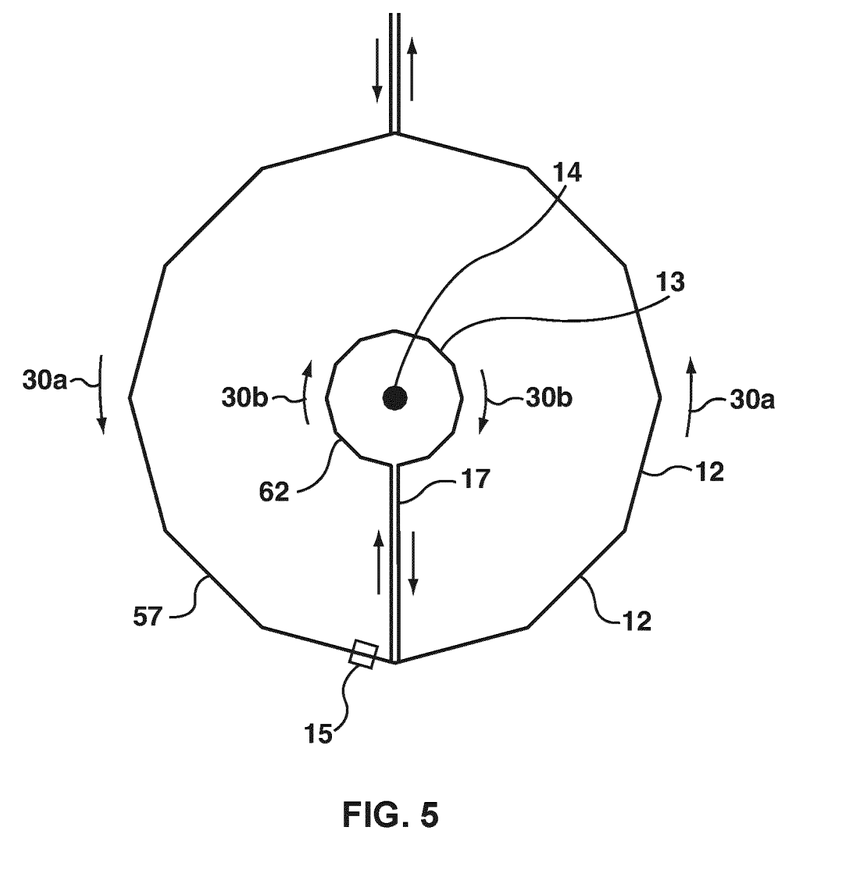
FIG. 5 is schematic top-view of the transmitter coil and bucking coil electrical connections in the system of FIG. 1.

FIG. 5 is a schematic diagram of the flow of current in some example embodiments in which the bucking loop 13 is present. In some example embodiments, the bucking coil 62 of bucking loop 13 consists of a single turn, while the transmitter coil 57 of transmitter loop 12 has multiple turns. One of the turns of the transmitter loop is interrupted by connection to cables 17 which carry current to and from the bucking coil 62 bucking loop 13. The two loops have a common center which is the location of the receiver 14. The loops are arranged so the direction of current flow 30*b* in the bucking loop coil 62 is opposite to the direction of flow 30*a* in the transmitter loop coil 57. The dimensions of the loops are chosen such that the ratio of the transmitter loop diameter to the bucking loop diameter is equal to the number of turns in the transmitter loop coil 57. Since the loops are in series, they carry approximately the same current. Under these conditions, at the receiver 14, the magnetic field of the current in the bucking loop approximately cancels the magnetic field of the current in the transmitter loop.

There is a significant parasitic capacitance between the turns of the coil 57 of the transmitter loop 12. There is also a significant parasitic capacitance between the two wires of the cable 17. When the current is rapidly changing, these parasitic capacitances shunt a portion of the current in each of the loops, causing instantaneous differences between the current in the transmitter loop and the current in the bucking loop.

Figure 6A:
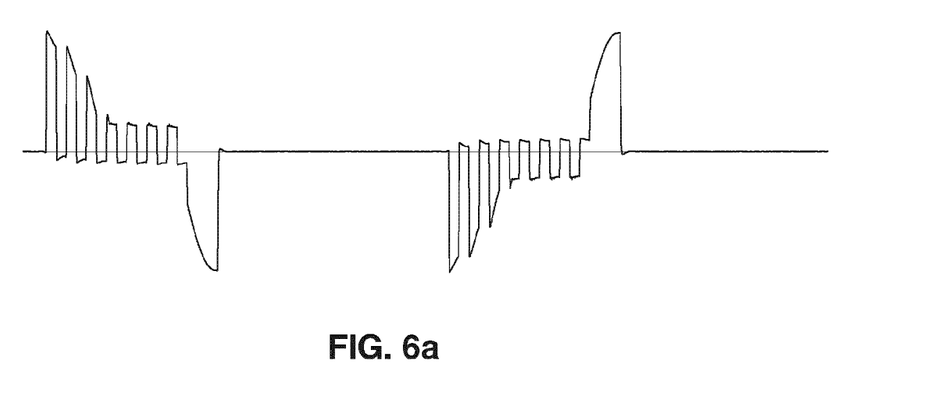
Figure 6B:
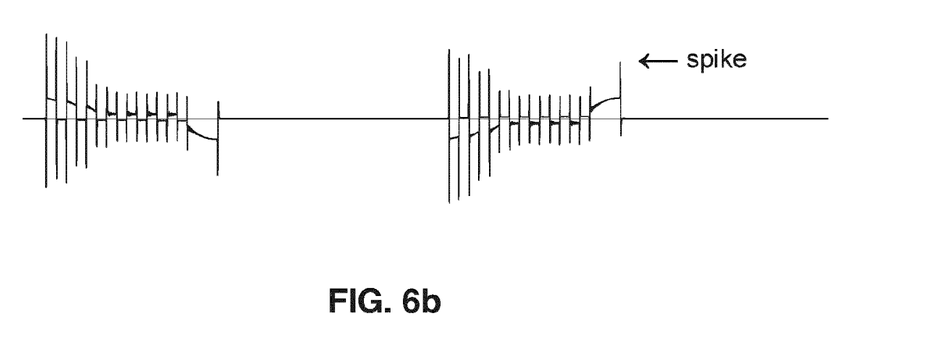

FIG. 6 shows the transmitter monitor sensor signal (FIG. 6a) and receiver Z-axis signal (FIG. 6b) for an example embodiment in which a bucking coil is present. The waveform of FIG. 6b is the residual waveform which results because the configuration of the bucking coil 62 and transmitter coil 57 do not produce exact cancellation of their respective magnetic fields. This waveform includes two components, one which is a replica of the transmitter monitor sensor 15 signal, and a second which consists of a set of spikes aligned with the edges of the transmitter monitor sensor waveform.

Figure 7:
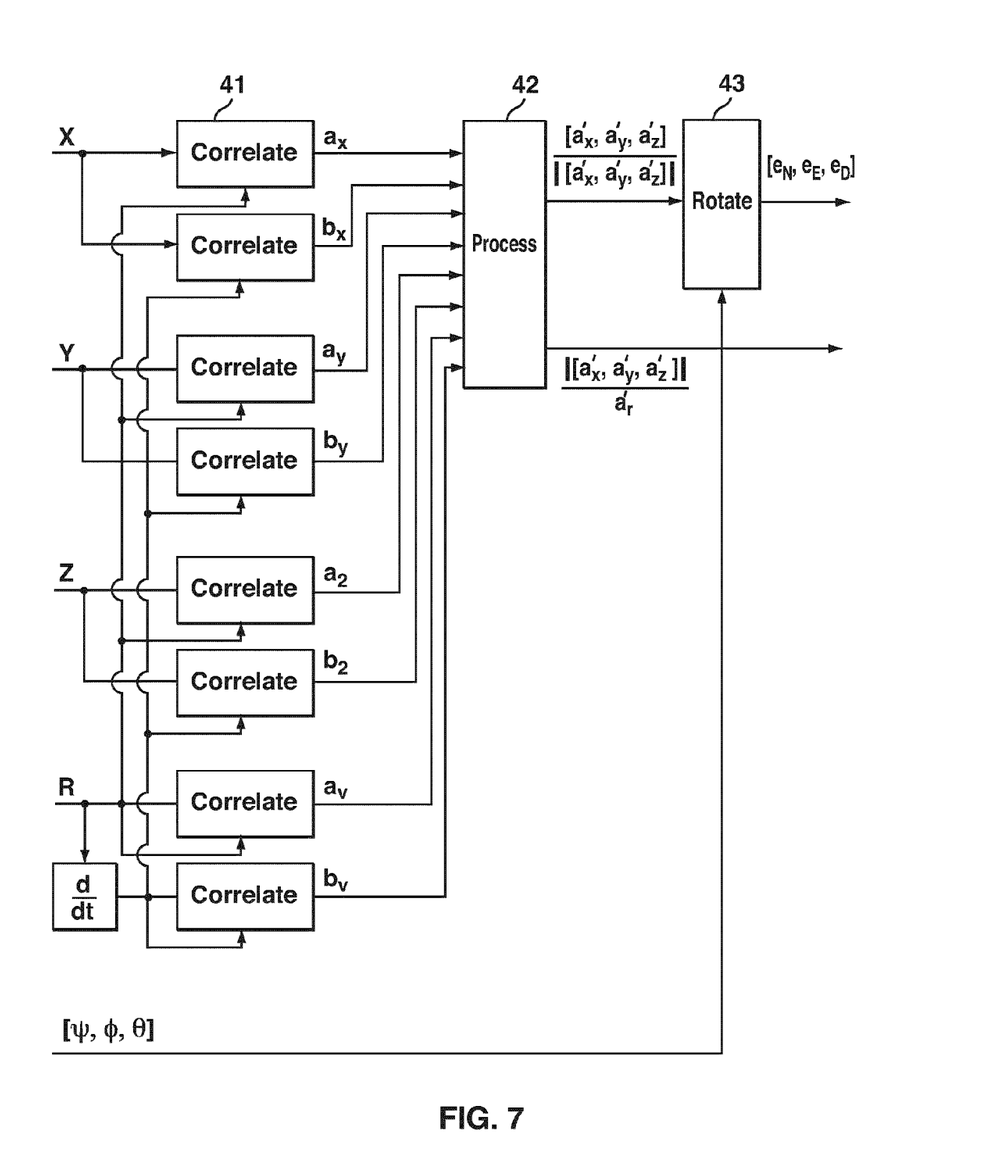
FIG. 7. is a block diagram of a signal processing technique which is used in some example embodiments where a bucking loop is present to determine the orientation of the primary field dipole moment in a geographic frame of reference.

FIG. 7 is a block diagram of a signal processing technique which is used in some example embodiments in which a bucking loop is present, to determine the orientation of the primary field dipole moment in a geographic frame of reference. The processing technique is a refinement of the technique shown in FIG. 4. It adds a differentiator 44 and four additional correlators 41 to the signal processing technique. The four additional correlators determine the component $b_x$, $b_y$, $b_z$, $b_r$ in each signal that is correlated with the time derivative of the current monitor sensor 15 signal. Since the correlation (at zero lag) between a signal and its first derivative is zero, this provides an independent set of parameters of the signal.

The current monitor sensor 15 senses the current in the transmitter loop. Therefore the waveform of the component of each receiver sensor signal which is caused by the magnetic field of the transmitter loop is a replica of the waveform of the current monitor sensor signal. That component will have zero correlation with the time derivative of the current monitor sensor signal. It follows that the correlations $b_x$, $b_y$, $b_z$ depend only on the magnetic field of the bucking loop, while the correlations $a_x$, $a_y$, $a_z$ depend substantially on the difference between the magnetic field of the transmitter loop and the magnetic field of the bucking loop. Given these two independent sets of measurements, the two separate amplitudes of the magnetic fields of the transmitter loop and the bucking loop can be determined for each of the receiver sensitive axes. The primary field dipole moment can be calculated from these results.

In some example embodiments, the current monitor sensor may be positioned on the bucking loop instead of the transmitter loop. The previously described procedure can then be used to separate the amplitudes of the fields of the two loops, the primary field dipole moment can be calculated from those results.

Many variations of the general principle are possible. Discrete components may be connected to the transmitter and bucking loops to cause and control differences between the transmitter loop current and the main loop current. Alternatively, a separate conductor can be bundled with the transmitter loop conductors and driven with a distinctive current waveform which is detected by the receiver sensor and isolated by the processing system.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention so that those skilled in the art should understand that they can make various changes, substitutions and alterations without departing from the scope of the invention as claimed. The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. An airborne time domain electromagnetic (TDEM) geological surveying system comprising:
   a transmitter loop that lies substantially in a plane during flight, the transmitter loop having regions that can have different relative positions to the plane in response to external forces;
   a receiver having three mutually non-parallel sensitive axes, the receiver being positioned at a substantially constant location relative to the transmitter loop;
   a processing system connected to receive signals from the receiver for the three sensitive axes, the processing system:
      measuring a sign and amplitude of a primary field generated by the transmitter loop and sensed by the receiver in each of the sensitive axes; and
      calculating, in dependence on the measured signs and amplitudes, a vector which represents orientation of the primary field at the receiver location in a receiver frame of reference; and
      determining, in dependence on the vector an orientation of the primary field dipole moment in a receiver frame of reference.

2. The system of claim 1 comprising an attitude and heading sensor unit sensing an attitude and heading of the receiver, the processing system rotating the primary field dipole moment into a geographical frame of reference in dependence on the sensed attitude and heading.

3. The system of claim 1 including an attitude sensing system for sensing an attitude of the transmitter loop in a geographical frame of reference, wherein the processing system estimates a primary field dipole moment in a geographical frame of reference in dependence on the attitude of the transmitter loop, and then estimates the receiver attitude in a geographical frame of reference in dependence on the difference between the estimated primary field dipole moment in the geographical frame of reference and the determined primary field dipole moment in a receiver frame of reference.

4. The system of claim 3 wherein the attitude sensing system comprises a plurality of spaced apart GPS sensors.

5. The system of claim 1 wherein the receiver is located substantially at a center of the transmitter loop.

6. The system of claim 1 wherein the three sensitive axes are mutually perpendicular.

7. The system of claim 1 further comprising:
   a bucking loop that lies substantially in a common plane with the transmitter loop and having regions that can have different relative positions to the plane in response to external forces, the receiver being located substantially at a center of the transmitter loop and the bucking loop, the transmitter loop and bucking loop having respective coils in series electrical connection with a current waveform in the coil of the transmitter loop and the coil of the bucking loop having differences, and wherein the processing system:

separates the measured sign and amplitude of the primary field sensed by the receiver in each of the sensitive axis into a transmitter loop contributed sign and amplitude component and a bucking loop contributed sign and amplitude component;

calculates the vector that represents orientation of the primary field at the receiver location in dependence on the transmitter loop contributed sign and amplitude components;

calculates a further vector that represents orientation of the field due to the bucking loop at the receiver location in dependence on the bucking loop contributed sign and amplitude components; and determines the orientation of the primary field dipole moment in dependence on both the vector and the further vector.

8. The system of claim 1 wherein the transmitter loop comprises a transmitter frame comprised of a plurality of frame segments connected together to form a loop supporting a transmitter coil.

9. The system of claim 8 wherein the receiver is secured in the location by radial cables that extend to the transmitter loop, and the transmitter loop is supported at multiple locations about a perimeter thereof by a suspension assembly.

10. The system of claim 1 wherein the processing system monitors a transmitter loop current, the vector which represents orientation of the primary field at the receiver location in the receiver frame of reference being determined in dependence on the transmitter loop current.

* * * * *